(12) United States Patent
Poortinga et al.

(10) Patent No.: US 10,709,153 B2
(45) Date of Patent: *Jul. 14, 2020

(54) POWDER COMPOSITION FOR AN AERATED FOOD PRODUCT

(71) Applicant: FRIESLANDCAMPINA NEDERLAND B.V., Amersfoort (NL)

(72) Inventors: Albert Thijs Poortinga, Amersfoort (NL); Paul Bastiaan Van Seeventer, Amersfoort (NL); Luben Nikolaev Arnaudov, Vlaardingen (NL); Simeon Dobrev Stoyanov, Vlaardingen (NL)

(73) Assignee: FRIESLANDCAMPINA NEDERLAND B.V., Amersfoort (NL)

( * ) Notice: Subject to any disclaimer, the term of this patent is extended or adjusted under 35 U.S.C. 154(b) by 547 days.

This patent is subject to a terminal disclaimer.

(21) Appl. No.: 15/027,748

(22) PCT Filed: Oct. 7, 2014

(86) PCT No.: PCT/NL2014/050696
§ 371 (c)(1),
(2) Date: Apr. 7, 2016

(87) PCT Pub. No.: WO2015/053623
PCT Pub. Date: Apr. 16, 2015

(65) Prior Publication Data
US 2016/0242437 A1 Aug. 25, 2016

(30) Foreign Application Priority Data
Oct. 8, 2013 (EP) .................................. 13187767

(51) Int. Cl.
*A23K 20/20* (2016.01)
*A23L 2/02* (2006.01)
(Continued)

(52) U.S. Cl.
CPC .............. *A23K 20/20* (2016.05); *A21D 8/025* (2013.01); *A23C 9/1524* (2013.01); *A23F 5/40* (2013.01);
(Continued)

(58) Field of Classification Search
CPC ........ A23L 29/27; A23L 33/40; A23L 29/015; A23L 29/20; A23L 2/02; A23L 2/39;
(Continued)

(56) References Cited

U.S. PATENT DOCUMENTS

| 4,438,147 A | 3/1984 | Hedrick |
| 4,576,645 A | 3/1986 | Ravel et al. |

(Continued)

FOREIGN PATENT DOCUMENTS

| CL | 2007002403 | 8/2007 |
| CL | 2007003166 | 10/2007 |

(Continued)

OTHER PUBLICATIONS

PCT, International Search Report, International Application No. PCT/NL2014/050696 (dated Jan. 29, 2015, 4 pages).
(Continued)

*Primary Examiner* — Katherine D LeBlanc
(74) *Attorney, Agent, or Firm* — Sunit Talapatra; Foley & Lardner LLP

(57) ABSTRACT

The invention relates to a powder composition for preparing a food product, to a method for preparing said powder composition, to a method for preparing a food product from said powder composition, to a food product obtainable by said method, and to a method for keeping gas bubbles in bulk liquid.

14 Claims, 7 Drawing Sheets

Figure 1:
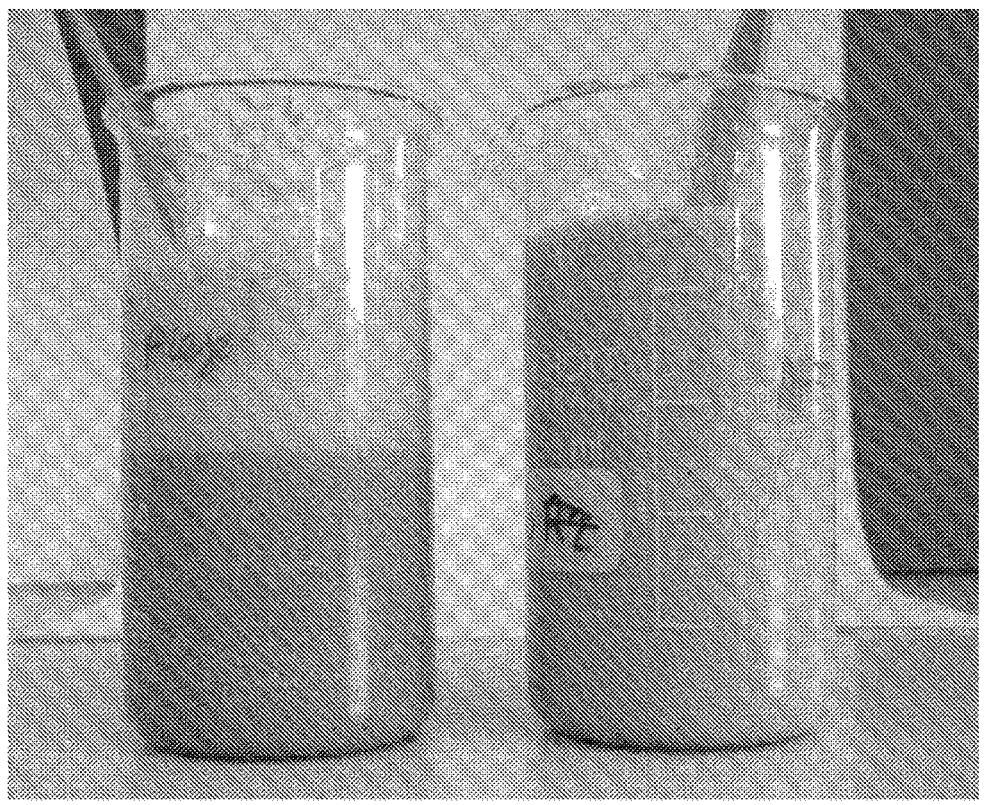

(51) Int. Cl.

| | | |
|---|---|---|
| *A23L 2/39* | (2006.01) | |
| *A23L 2/40* | (2006.01) | |
| *A23F 5/40* | (2006.01) | |
| *A23K 50/40* | (2016.01) | |
| *A23L 29/00* | (2016.01) | |
| *A23P 30/40* | (2016.01) | |
| *A23L 33/00* | (2016.01) | |
| *A23L 29/269* | (2016.01) | |
| *A23L 29/20* | (2016.01) | |
| *A21D 8/02* | (2006.01) | |
| *A23C 9/152* | (2006.01) | |
| *A23G 1/56* | (2006.01) | |
| *A23G 3/52* | (2006.01) | |
| *A23L 1/00* | (2006.01) | |
| *A23L 1/054* | (2006.01) | |
| *A23L 1/29* | (2006.01) | |

(52) U.S. Cl.
CPC ............... *A23G 1/56* (2013.01); *A23G 3/52* (2013.01); *A23K 50/40* (2016.05); *A23L 1/0041* (2013.01); *A23L 1/0097* (2013.01); *A23L 1/0541* (2013.01); *A23L 1/296* (2013.01); *A23L 2/02* (2013.01); *A23L 2/39* (2013.01); *A23L 2/40* (2013.01); *A23L 29/015* (2016.08); *A23L 29/20* (2016.08); *A23L 29/27* (2016.08); *A23L 33/40* (2016.08); *A23P 30/40* (2016.08); *A23V 2002/00* (2013.01)

(58) Field of Classification Search
CPC ........... A23L 2/40; A23K 20/20; A23P 30/40; A21D 8/025; A23C 9/1524; A23F 5/40; A23G 1/56; A23G 3/52
See application file for complete search history.

(56) References Cited

U.S. PATENT DOCUMENTS

| | | | |
|---|---|---|---|
| 2005/0214429 A1 | 9/2005 | Anderson et al. | |
| 2007/0116848 A1 | 5/2007 | Aldred et al. | |
| 2010/0209582 A1 | 8/2010 | Wyss et al. | |
| 2010/0310746 A1 | 12/2010 | Leser et al. | |
| 2011/0212242 A1 | 9/2011 | Zeller | |
| 2012/0053339 A1* | 3/2012 | Clark .................. | C12R 1/64 |
| | | | 536/114 |

FOREIGN PATENT DOCUMENTS

| | | |
|---|---|---|
| EP | 0 458 310 | 11/1991 |
| EP | 1 797 772 | 6/2007 |
| EP | 1 538 924 | 9/2007 |
| EP | 1 978 824 B1 | 10/2008 |
| EP | 2 025 238 | 2/2009 |
| RU | 2489028 C2 | 12/2010 |
| WO | 98/34495 | 8/1998 |
| WO | 2006/023564 | 3/2006 |
| WO | 2006/023565 | 3/2006 |
| WO | 2010/005297 | 1/2010 |
| WO | 2011/114151 | 9/2011 |
| WO | 2012/030651 | 3/2012 |
| WO | 2013/034520 | 3/2013 |

OTHER PUBLICATIONS

PCT, Written Opinion, International Application No. PCT/NL2014/050696 (dated Jan. 29, 2015, 11 pages).

* cited by examiner

POWDER COMPOSITION FOR AN AERATED FOOD PRODUCT

This application is a National Stage of co-pending PCT/NL2014/050696 filed Oct. 7, 2014, which claims priority to EP 13187767.2 filed Oct 8, 2013.

The invention relates to a powder composition for preparing a food product, to a method for preparing said powder composition, to a method for preparing a food product from said powder composition, to a food product obtainable by said method, and to a method for keeping gas bubbles in bulk liquid.

PARTIES TO A JOINT RESEARCH AGREEMENT

The claimed invention was made by, on behalf of, and/or in connection with one or more of the following parties to a joint research agreement: FrieslandCampina Nederland BV and Conopco, Inc., D/B/A Unilever. The joint research agreement was in effect on or before the date the claimed invention was made, and the claimed invention was made as a result of activities undertaken within the scope of the joint research agreement.

Various food products can be prepared by the addition of water to a powder mixture to dissolve or disperse the powder mixture and prepare the food products. A popular kind of such food products are powdered instant food products. The food product is prepared by simply mixing the powder with (hot) water, resulting in a ready-to-consume product. Thus instant food products allow consumers (or vendors or vendor-machines) to prepare the food product in a fast and simple manner.

Examples of powdered instant food products are instant soup powders, instant infant formulae, and instant coffee products.

In various applications it is desirable to provide an instant powder that allows the preparation of a food product that contains gas bubbles, such as a foam layer on top of the product (e.g. cappuccino) or in the bulk of the product. There are various reasons of why this may be desired, such as visual appearance, organoleptic sensations (e.g. taste, mouthfeel, scent) or even dietary reasons (less caloric value per volume).

Thus, there is also a need to provide instant products that allow the preparation of an instant food product, such as a beverage, which food product contains a means to release gas bubbles when mixed with water.

The prior art gives numerous examples of dry powders that create a foam layer on top of the beverage (typically for cappuccino-type instant coffee powders). WO 2006/023564 A1, for instance relates to a powder that releases gas when mixed with water to create a beverage. These powders can be used to create a foam layer, for example to produce a cappuccino-like foamy, frothy layer on top of coffee.

For the preparation of food products wherein bas bubbles are dispersed throughout the bulk of the products (e.g. aerated yoghurt or jam) EP 1 797 772 A1 describes a self-foaming liquid culinary aid, comprising a first liquid component comprising an acid, and a second liquid component comprising an edible salt. Powdered instant compositions for preparing such food products would be advantageous, e.g. in view of shelf-life. However, no commercially available instant powdered products are known.

Recently WO 2013/034520 A1 has been published. This document relates to a powder composition suitable for forming a foam upon reconstitution in a liquid, comparing a foamer ingredient that releases gas bubbles upon reconstitution in water and a thickening agent. The thickening agent can be any suitable compound capable of increasing the viscosity and keeping the bubbles dispersed in the liquid. Most preferably the thickening agent is pregelatinised starch. No details are given about specific properties of the thickening agent, other than its capability of increasing the viscosity and keeping the bubbles dispersed.

It would be desirable to have an alternative for the use of starch as a means to maintain the bubbles dispersed in the bulk of the product. For instance, starch is a polysaccharide with a high glycaemic index and it adds to the caloric value of the product. Further, the thickening properties of starch are not always desirable. Further a side-effect of starch may be a slimy mouth-feel, that is not appreciated by all consumers.

WO 2013/034520 A1 also shows an Example for preparation of a coffee product using an unspecified xanthan gum, an unspecified guar gum or lambda carrageenan MV306 It is unclear which guar gum or xanthan gum was used. The present inventors found that reconstitution of an instant coffee drink powder comprising, e.g., xanthan gum commercially available as Keltrol RD, resulted in a drink wherein a thick foam layer on top of the bulk formed within less than 10 min.

It is an object of the present invention to provide an (alternative) powder composition suitable for the preparation of an instant food product selected from the group of coffee and other coffee-based beverages;

chocolate milk and other cocoa-based beverages:

fruit and/or vegetable-based beverages;

fluid dairy products, other than ice-cream and liquid dairy products labelled as weight management meal replacers;

dry dairy products, other than dry powder dairy products labelled as weight management meal replacers;

infant nutrition products;

bakery and confectionary products;

toppings and desserts, other than ice-cream;

animal feeds;

pet food products;

clinical nutrition food products.

In particular, the present invention aims to provide an instant powder composition for preparing a food product, in particular a beverage, another liquid food product or a spoonable food product, with satisfactory organoleptic properties, which food product contains gas bubbles dispersed in the bulk of the product and wherein the gas bubbles remain in bulk within a time period that which is long enough for the consumer to consume the food composition.

More in particular it is an object to provide such a composition which after reconstitution in an aqueous liquid forms an aerated product wherein the gas bubbles are dispersed in the bulk of the product, which product imparts a creamy mouth-feel, in particular a mouth-feel resembling fat globules, when consumed.

The inventors have found that it is possible to provide a powder composition suitable for preparing a food product comprising gas bubbles dispersed in a matrix phase (i.e. a continuous phase wherein the bubbles—a discontinuous phase—are dispersed) by combining a gas release agent, an other instant food component, in particular a flavour component and a specific hydrocolloid.

Accordingly the invention relates to a powder composition for preparing a food product comprising gas bubbles dispersed in a continuous phase, which food product is selected from the group of
- coffee and other coffee-based beverages;
- chocolate milk and other cocoa-based beverages;
- fruit and/or vegetable-based beverages;
- fluid dairy products, other than fluid ice-cream, preferably fluid dairy products, other than fluid ice-cream and liquid dairy products labelled as weight management meal replacers;
- dry dairy products, preferably other than dry powder dairy products labelled as weight management meal replacers;
- infant nutrition products;
- bakery and confectionary products;
- toppings and desserts, other than ice-cream;
- animal feeds;
- pet food products;
- clinical nutrition food products (i.e. food products for use in enhancing, maintaining or restoring health and/or prevent a disease, prescribed by a health care professional like a physician, nurse, or dietician, and destined for and supplied to persons in need thereof);

the powder composition comprising
a) a gas release agent in particulate form;
b) a hydrocolloid in particulate form; and
c) an instant food component in particulate form for one of said food products.
wherein upon reconstitution of the powder composition in an aqueous fluid, the hydrocolloid is reconstituted thereby thickening the fluid to form the continuous phase, gas bubbles are formed from the gas release agent, and formed gas bubbles are entrapped in the continuous phase.

Further, the invention relates to a powder composition for preparing a food product comprising gas bubbles dispersed in a continuous phase, which food product is selected from the group of
- coffee and other coffee-based beverages;
- chocolate milk and other cocoa-based beverages;
- fruit and/or vegetable-based beverages;
- fluid dairy products other than fluid ice-cream and preferably other than liquid dairy products labelled as weight management meal replacers;
- dry dairy products, preferably other than dry powder dairy products labelled as weight management meal replacers
- infant nutrition products;
- bakery and confectionary products;
- toppings and desserts, other than ice cream;
- animal feeds;
- pet food products;
- clinical nutrition food products (i.e. food products for use in enhancing, maintaining or restoring health and/or prevent a disease, prescribed by a health care professional like a physician, nurse, or dietician, and destined for and supplied to persons in need thereof);

the powder composition comprising
a) 5-95 wt. %. gas release agent in particulate form;
b) 0.5-5 wt. % xanthan gum, preferably a xanthan gum selected from the group of thixotropic xanthan gums.
c) the balance, one or more instant food ingredients for said food products other than the gas release agent and the xanthan gum.

Further, the invention relates to a method for preparing a food product selected from the group of
- coffee and other coffee-based beverages;
- chocolate milk and other cocoa-based beverages;
- fruit and/or vegetable-based beverages;
- fluid dairy products other than fluid ice-cream and preferably other than liquid products labelled as weight management meal replacers;
- dry dairy products, preferably other than dry powder dairy products labelled as weight management meal replacers;
- infant nutrition products;
- bakery and confectionary products;
- toppings and desserts, other than ice cream;
- animal feeds;
- pet food products;
- clinical nutrition food products;

the method comprising reconstituting a composition according to any of the preceding claims with an aqueous liquid, in particular with water.

Further, the invention relates to a food product containing gas bubbles in the bulk, obtainable by a method according to the invention.

Further, the invention relates to a method for keeping gas bubbles in bulk liquid by using a hydrocolloid in particulate form that provides an apparent yield stress of at least 0.5 Pa within a period of 60 seconds after the addition of water to reconstitute the hydrocolloid.

Further, the invention relates to a method for preparing a powder composition according to the invention, comprising dry-blending the gas release agent in particulate form, the hydrocolloid, such as a xanthan gum, in particulate form and the food component in particulate form.

Further, the invention relates to a method for preparing a powder composition according to the invention, wherein a blend is provided of the gas release agent in particulate form and the hydrocolloid in particulate form and wherein said blend is dry-blended with the food component in particulate form.

A powder composition according to the invention can be used to provide a food product, ready for consumption, by mixing it with water.

When the powder composition is reconstituted in an aqueous liquid, bubbles are introduced the liquid, as gas is released by the gas release agent. The bubbles are dispersed in the aqueous phase (matrix phase), whereby a food product is provided having an internal foamed texture. Typically essentially throughout the food product bubbles are entrapped in the continuous phase. In contrast, in beverages like cappuccino or beer essentially all bubbles formed in the bulk rise to the top relatively quickly to form (foam) froth on top of the product.

A powder composition according to the invention has been found particularly suitable to be dissolved or dispersed (i.e. reconstituted) in an aqueous liquid to provide a food product, such as a fluid food product or a spoonable food product, wherein bubbles remain dispersed in the bulk of the product for a sufficiently long time to prepare, serve and consume the product.

In a preferred embodiment, the food product has an organoleptic property that is appreciated by consumers, not only because of the sensation given by the presence of bubbles but also in that the product imparts a creamy mouth-feel, in particular a mouth-feel resembling fat globules, when consumed.

Further, the invention is in particular advantageous in that it allows the preparation of a fluid food product wherein bubbles remain dispersed in the bulk, and which food product preferably has a creamy, at a relatively low viscosity of the product. To this effect, preferably use is made of a hydrocolloid of which a solution or dispersion in water shows thixotropic behaviour.

Further, the invention provides a powder composition for preparing a food product (fluid or spoonable) wherein bubbles remain dispersed in the bulk, wherein the concentration of the hydrocolloid, contributing to maintaining the bubbles in the bulk for a prolonged time, is relatively low to obtain a dispersion-stabilising effect, compared to—e.g. —a thickening agent, such as starch, disclosed in WO 2013/034520 A1.

Further, the invention is advantageous in that it may have an enhanced taste or smell, compared to a similar product wherein the bubbles are absent. Thus the concentration of flavours, such as salt or sugar, or aroma's may be reduced to impart a similar taste or scent sensation.

Unless defined otherwise, all technical and scientific terms used herein have the same meaning as commonly understood by one of ordinary skill in the art.

All percentages, unless otherwise stated, refer to the percentage by weight. The abbreviation 'wt %' refers to percentage by weight. In case a range is given, the given range includes the mentioned endpoints.

Gas volumes are given at a temperature of 20° C. and a pressure of 1 atmosphere (1.01325 bara), unless indicated otherwise.

Room temperature is 23±2° C.

The term "or" as used herein means "and/or" unless specified other wise.

The term "a" or "an" as used herein means "at least one" unless specified otherwise.

The term "substantial(ly)" or "essential(ly)" is generally used herein to indicate that it has the general character or function of that which is specified, for instance when referring to essentially spherical it means that it has at least the general appearance of a sphere. When referring to a quantifiable feature, these terms are in particular used to indicate that it is for at least 75%, more in particular at least 90%, even more in particular at least 95% of the maximum that feature.

When referring to a "noun" (e.g. a compound, an additive etc.) in singular, the plural is meant to be included, unless specified otherwise.

For the purpose of clarity and a concise description features are described herein as part of the same or separate embodiments, however, it will be appreciated that the scope of the invention may include embodiments having combinations of all or some of the features described.

The term 'hot' in relation to a beverage is generally understood in the art. Typically, 'hot' means a temperature of at least 50° C., in particular 60-100° C., more in particular 80-95° C.

Milk: milk originating from a mammal, preferably originating from a cow, sheep, goat, horse, more preferably originating from a cow.

Dairy ingredient: any ingredient selected from the group of milk proteins (i.e. casein, caseinate, whey proteins), hydrolysates of milk proteins, milk fats and lactose.

Dairy-based food product: milk or any (processed) food product containing or made, obtained or derived from milk and milk products other than milk, or milk derivatives, either alone or combined with another (agricultural) product, and wherein the total content of dairy ingredients is more than 0.1%. Dairy-based food products in particular include milk, dairy-cream, butter milk, kefir, kumis/airag, milk powder (powdered milk), condensed milk, khava, evaporated milk, ricotta cheese, infant formulae (liquid and powder), dried milk powder, butter, cheese produced by co-agulating milk, casein, whey and/or whey fractions, yoghurt, which may be a spoonable yoghurt or a yoghurt drink, and other fermented milk products, and other milk products.

Ice-cream: frozen food product, intended for consumption at a temperature below 0° C. that contains water and sugar. Ice-cream may further contain dairy ingredients, fruit, fruit juice, fruit extracts, flavours, and other ingredients like nuts and chocolate.

Fruit and/or vegetable-based beverages, are beverages comprising a substance from fruit or beverage, in particular fruit pieces, vegetable pieces, fruit juice, or vegetable juice. The total content of substances from fruit or beverage in the fruit and/or vegetable based beverage generally is at least 0.5 wt. %, in particular at last 2 wt. %, more in particular at least 5 wt. %. The content of ingredients originating from dairy milk is typically lower than 0.1% by weight, and the content of soy ingredients (soy protein, soy carbohydrate, soy fat) is typically lower than 0.1% by weight.

Beverage or (liquid) food composition for weight management (:weight management meal replacer) food products that are marketed to aid the consumer to lose weight or at least not to increase weight; these products may contain ingredients originating from milk. As is known to the skilled person, these products usually are packaged in a package containing a claim (label) that they can aid the consumer to lose weight. Thus, as will be understood by the skilled person, products labelled as weight management meal replacers are intended for use in aiding a consumer to lose weight or at least not to increase weight. These products may contain ingredients originating from milk. A beverage or liquid food composition for weight management preferably reduces in an individual the desire to eat a meal or a snack, preferably increases satiety of the individual, preferably produces an enhanced feeling of 'fullness'.

Clinical nutrition food products: food products for use in enhancing, maintaining or restoring health and/or prevent a disease, prescribed by health care professional like a physician, nurse, or dietician, and destined for and supplied to persons in need thereof.

The hydrocolloid present in the powder composition is reconstitutable in water or another aqueous liquid thereby thickening the fluid and entrapping gas bubbles which are released in the liquid by the addition of water to the gas release agent. The inventors realised that it is advantageous to use a hydrocolloid that imparts a threshold apparent yield stress within a relatively short time span upon reconstitution. The stress that is generated by the dissolved or dispersed hydrocolloid determines whether gas bubbles rise to the surface or are entrapped in the liquid.

The yield stress can be detected qualitatively. If in a certain system gas bubbles stay suspended and do not cream for a certain period of time, e.g. minutes to hours, then the yield stress of the system is high enough to keep the bubbles suspended. The yield stress that is generated by the dissolved hydrocolloid determines whether gas bubbles rise to the surface or are entrapped in the liquid.

The condition for static bubbles in a liquid which possesses an (apparent) yield stress is (Dubash, N., Frigaard, I. Conditions for static bubbles in viscoplastic fluids, 2004, Physics of Fluids 16(12), p. 4319-4330).

$$\tau \geq \frac{(\rho l - \rho g)gDb}{2\sqrt{2}} \quad (1)$$

$$\tau \geq \frac{(\rho l - \rho g)gDb}{2\sqrt{2}}$$

Where $\tau$ (in Pa) is the apparent yield stress, $\rho_l$ is the density of the liquid, $\rho_g$ is the density of the gas, g=9.816 m·s$^{-2}$, and $D_b$ is the bubble diameter.

The yield stress is the force required to keep a bubble with volume $\frac{1}{6}\cdot\pi\cdot D_b^3$ stationary in the liquid, counteracting the buoyancy. The buoyancy is determined by the density difference between the liquid and the gas, the gravity constant and the surface area of the largest cross-section of the bubble $\frac{1}{4}\cdot\pi\cdot D_b^2$.

Usually, the hydrocolloid is present in an effective amount to provide an apparent yield stress of at least 0.3 Pa within a period of 60 seconds after the addition of water, preferably within a period of 30 seconds, more preferably within a period of 15 seconds, in particular within a period of 10 seconds after the addition of water to reconstitute the hydrocolloid. The yield stress may be determined based upon the information disclosed herein, in particular in Example 3. The value of the yield stress of the product is the yield stress at 23° C. In particular if the product is intended for consumption at a different temperature, the yield stress preferably also has a minimum or maximum value as mentioned herein at that temperature. Accordingly, in particular for cold applications the yield stress is preferably at least 0.3 within a period of 60 seconds after the addition of water, preferably within a period of 30 seconds, more preferably within a period of 15 seconds, in particular within a period of 10 seconds after the addition of water to reconstitute the hydrocolloid at a temperature of 4° C. Accordingly, in particular for hot applications the yield stress is preferably at least 0.3 within a period of 60 seconds after the addition of water, preferably within a period of 30 seconds, more preferably within a period of 15 seconds, in particular within a period of 10 seconds after the addition of water to reconstitute the hydrocolloid at a temperature of 80-95° C., more in particular at 85° C.

Preferably, the hydrocolloid provides an apparent yield stress of at least 0.5 Pa, preferably at least 1.0 Pa, more preferably at least 1.5 Pa, within a period of 60 seconds after the addition of water to reconstitute the hydrocolloid.

In a particularly preferred embodiment, the hydrocolloid provides an apparent yield stress of at least 0.5 Pa within a period of 15 seconds, preferably within a period of 10 seconds after the addition of water or other aqueous liquid to reconstitute the hydrocolloid.

In a specifically, preferred embodiment, the hydrocolloid provides an apparent yield stress of at least 0.7 Pa, preferably at least 1 Pa, preferably at least 1.5 Pa, within a period of 30 seconds after the addition of water to reconstitute the hydrocolloid. ably More preferred the hydrocolloid provides an apparent yield stress of at least 0.7 Pa, preferably at least 1 Pa, preferably at least 1.5 Pa, within a period of 15 seconds, preferably 10 seconds, after the addition of water to reconstitute the hydrocolloid.

Usually, the yield stress that is obtained within a period of 15 seconds is 5 Pa or less, preferably 4.5 Pa or less, more preferably 4.0 Pa or less.

Usually, the yield stress that is obtained within a period of 30 seconds is 5 Pa, preferably 4.5 Pa or less, more preferably 4.0 Pa or less.

The yield stress of the product, ready for consumption usually is 5 Pa or less, in particular 4.5 Pa or less, more in particular 4.0 Pa or less.

In particular, good results have been achieved with a hydrocolloid, which forms a thixotropic fluid after reconstitution in water, at least in the presence of the other ingredients for the food product, at consumption temperature. In general, a hydrocolloid is preferred that is suitable to provide a thixotropic composition, when reconstituted in water at a temperature of 25° C. Such hydrocolloids are also referred herein as 'thixotropic'. Preferably, a solution or dispersion of 0.5 g/l or less of the hydrocolloid in water of 25° C. is thixotropic, in particular a solution or dispersion of the hydrocolloid of about 0.2 g/l or less, e.g. about 0.1 g/l.

Preferably, the hydrocolloid is a thixotropic gum, in particular a thixotropic xanthan gum.

A specific advantage of a product according to the invention wherein the hydrocolloid is a gum, such as a xanthan gum, compared to a product wherein the hydrocolloid is a starch, present in an effective amount to entrap bubbles in the bulk of the product, resides in a lower caloric content and/or a lower glycaemic index of the food product. Moreover, the thickening properties of starch are not always desirable. Further a side-effect of starch may be a slimy mouthfeel, that is not appreciated by all consumers.

In an advantageous embodiment, the hydrocolloid, in particular the xanthan gum, has a hydration rate in water at a temperature of 23° C. at a concentration of 1 wt % and a volume weighted mean diameter D4,3 of the hydrocolloid ranging from 40 to 200 micrometer, of less than 3 minutes.

Preferably, the hydrocolloid comprises a xanthan gum, having the following properties in solution, at 23° C.:
 a hydration rate of less than 3 minutes in a 1 wt % NaCl solution at a 1 wt % concentration of xanthan gum; and
 an ability to fully hydrate in less than 10 minutes in a 6 wt % NaCl solution at a 1 wt % concentration of xanthan gum.

Such xanthan gum is particularly preferred for it high yield stress. Further, it allows the preparation of a thixotropic food product.

Preferably the hydrocolloid comprises a xanthan gum, having one or more of the following properties in solution:
 a) a low shear rate dynamic viscosity at 3 rpm of greater than 1600 mPa·s when hydrated in standard tap water at a 0.25 wt % concentration of xanthan gum;
 b) a sea water dynamic viscosity of greater than about 18 at 2.85 kg/m$^3$ (1 pound/barrel) when hydrated in synthetic sea water;
 c) a hydration rate of less than 3 minutes in a 1 wt % NaCl solution at a 1 wt % concentration of xanthan gum;
 d) an ability to essentially fully hydrate in less than 10 minutes in a 6 wt % NaCl solution at a 1 wt % concentration of xanthan gum.

Such xanthan gum is particularly preferred for it high yield stress. Further, it allows the preparation of a thixotropic food product.

Said viscosities, said hydration rate and said ability are determinable as defined in WO 2012/030651 A1.

Preferably the xanthan gum has a hydration rate of less than 2 minutes in a 1 wt % NaCl solution at a 1 wt % concentration of xanthan gum.

Preferably, the xanthan gum has a hydration rate of less than 3 minutes in a 1 wt % NaCl solution at a 1 wt % concentration of xanthan gum at 23° C. and an ability to fully hydrate in less than 10 minutes in a 6 wt % NaCl solution at a 1 wt % concentration of xanthan gum at 23° C.

Preferably, the xanthan gum has one or more of the following properties in solution:

a Low Shear Rate Dynamic Viscosity at 3 rpm of more than about 1800 mPa·s when hydrated in standard tap water at a 0.25 wt % concentration of xanthan gum;

a Low Shear Rate Dynamic Viscosity at 3 rpm of more than about 1750 mPa·s in a 0.01 M NaCl solution at a 0.25 wt % concentration of xanthan gum; and/or a Low Shear Rate Dynamic Viscosity at 3 rpm of more than about 1700 mPa·s in a 0.1 M NaCl solution at a 0.25 wt % concentration of xanthan gum.

Preferably the xanthan gum has a Sea Water Dynamic Viscosity of more than about 20 at 2.85 kg·m 3 (1 pound/barrel) when hydrated in synthetic sea water.

Preferably the xanthan gum has a Hydration Rate of less than about 2 minutes in a 1 wt % NaCl solution at a 1 wt % concentration of xanthan gum, or preferably less than about 4 minutes in a 3 wt % NaCl solution at a 1 wt % concentration of xanthan gum, or preferably less than about 6 minutes in a 3 wt % citric acid solution at a 0.4 wt % concentration of xanthan gum.

Preferably the xanthan gum has the ability to essentially fully hydrate in less than about 8 minutes in a 6 wt % NaCl solution at a 1 wt % concentration of xanthan gum, or fully hydrate after about 1 hour of proper mixing at 1800 rpm under ambient conditions in a 10 wt % ammonium nitrate solution at a 0.2 wt % concentration of xanthan gum.

Preferably the xanthan gum has a dynamic viscosity, as measured using a Brookfield Model LV viscometer, No. 1 Spindle, at 3 rpm, after one hour of mixing at 1800 rpm under ambient conditions of more than about 1750 mPa·s when hydrated in a 0.01 M NaCl solution at a 0.25 wt % concentration of xanthan gum, preferably more than about 1900 mPa·s, preferably more than about 2100 mPa·s. Preferably, under these conditions the preferred xanthan gum has a dynamic viscosity of maximally 2400 mPa·s, preferably 2600 mPa·s.

Preferably the xanthan gum has a dynamic viscosity of more than about 1900 mPa·s when hydrated in a 0.1 M NaCl solution at a 0.25 wt % concentration of xanthan gum, preferably more than about 2100 mPa·s.

Preferably the hydrocolloid comprises a xanthan gum that has been obtained from the fermentation of an Asian *Xanthomonas campestris* strain, i.e., *Xanthomonas campestris* pathover *campestris*, deposited with the American Type Culture Collection (ATCC) under the accession no. PTA-11272. The fermentation requires a nitrogen source, a carbon source and other appropriate nutrients known to the skilled person.

These preferred properties may be combined into the properties of the preferred hydrocolloid comprising xanthan gum in any order. Therefore the preferred hydrocolloid comprising xanthan gum may exhibit any one, any two, any three, any four, any five, any six, or all of the listed properties.

The terms 'fully hydrate', 'essentially fully hydrate', 'full hydration', '100% hydration', and the like as used herein mean that the solution has a homogeneous appearance, such that there is an absence of particles that are visible to the unaided human eye and the viscosity of the solution in the particular medium is not substantially changed from the viscosity obtained in standard tap water. The description 'not substantially changed' is used herein to mean that the viscosity of the solution in the particular medium differs by less than about 25%, alternatively less than about 20%, alternatively less than about 15%, alternatively less than about 10%, alternatively less than about 7%, or alternatively less than about 5%, from the viscosity obtained in standard tap water.

Standard tap water (STW) is water as prepared by dissolving 1.0 g of NaCl and 0.15 g $CaCl_2.2H_2O$ in 1 liter of deionized water.

Preferably, when the preferred hydrocolloid comprising a xanthan gum that is hydrated in standard tap water to a 0.25 wt % concentration of xanthan gum, the resulting solution preferably has a Low Shear Rate Dynamic Viscosity at 3 rpm of more than about 1800 mPa·s.

Preferably when hydrated in standard tap water to a 0.25 wt % concentration of xanthan gum, the solution has a Low Shear Rate Dynamic Viscosity at 3 rpm of more than about 2000 mPa·s. Preferably when the preferred xanthan gum is hydrated in standard tap water to a 0.25 wt % concentration, the solution preferably has a Low Shear Rate Dynamic Viscosity at 3 rpm of more than about 1600 mPa·s, preferably more than about 1800 mPa·s, preferably more than about 2000 mPa·s, preferably more than about 2200 mPa·s, preferably more than about 2500 mPa·s. Unless otherwise specified, under these conditions, when hydrated in standard tap water to a 0.25 wt % concentration of xanthan gum, the solution can have a Low Shear Rate Dynamic Viscosity at 3 rpm of up to about 2700 mPa·s, or up to about 2900 mPa·s.

Preferably the xanthan gum has a Sea Water Dynamic Viscosity of more than about 20 at 2.85 kg·m$^{-3}$ (1 pound/barrel), preferably more than about 22 kg·m$^{-3}$, preferably more than about 24.0 at 2.85 kg·m$^{-3}$ (1 pound/barrel), preferably up to about 28.0 at 2.85 kg·m$^{-3}$ (1 pound/barrel).

With respect to Hydration Rate, a preferred hydrocolloid comprises a xanthan gum that preferably has solution properties as follows. Preferably the xanthan gum has a Hydration Rate of less than about 3 minutes, less than about 2.5 minutes, less than about 2 minutes, or less than about 1.5 minutes in a 1 wt % NaCl solution at a 1 wt % concentration of xanthan gum. Preferably, even when the NaCl level of the solution is increased to 3 wt %, the xanthan gum at a 1 wt % concentration when in solution exhibits a Hydration Rate of less than about 4 minutes, preferably less than about 3 minutes, preferably less than about 2 minutes. In other media, such as a 3 wt % citric acid solution at a 0.4 wt % concentration of xanthan gum, preferably the Hydration Rate is also relatively fast at less than about 6 minutes. For a solution of 40 wt % sucrose+4 wt % NaCl at a 0.35 wt % concentration of xanthan gum, preferably the Hydration Rate is less than about 8 minutes.

The preferred hydrocolloid comprises a xanthan gum that preferably is more tolerant of difficult hydration media. Preferably the xanthan gum has the ability to essentially fully hydrate in less than about 10 minutes, less than about 9 minutes, less than about 8 minutes, less than about 7 minutes, or less than about 6 minutes in a 6 wt % NaCl solution at a 1 wt % concentration of xanthan gum. For conventional xanthan gum 6 wt % NaCl is sufficient to inhibit the hydration of the gum.

Further, preferably the xanthan gum is able to obtain full hydration in about 1 hour of propeller mixing at 1800 rpm under ambient conditions in a 10 wt % ammonium nitrate solution at a 0.2 wt % concentration of xanthan gum (3 rpm dynamic viscosity of 5000 mPa·s, Brookfield No. 1 spindle). Under these conditions, preferably the xanthan gum is able to obtain full hydration in about 0.7 hour, in about 0.8 hour, in about 0.9 hour, in about 1.0 hour, in about 1.1 hour, in about 1.2 hour, or in about 1.3 hour of propeller mixing at 1800 rpm under ambient conditions in a 10 wt % ammonium nitrate solution at a 0.2 wt % concentration of xanthan gum.

The test methods described herein to characterise a xanthan gum are the following.

Low Shear Rate Dynamic Viscosity. Xanthan gum (0.75 g, accuracy 0.01 g) is slowly added to 299 mL of standard tap water contained in a 400 mL tall form beaker while stirring at 800±20 rpm. Stirring is continued for approximately 4 hours. Just before removing the test solution from stirring (after 4 hours), the solution temperature is adjusted to 25±2° C. The test solution is removed from the stirrer and allowed to sit undisturbed at room temperature for 30±5 minutes (may be placed in a temperature-controlled water bath). After 30 minutes the temperature is measured by inserting a thermometer into the solution between the center and the side of the beaker. For accuracy, the solution is not disturbed prior to measuring the dynamic viscosity. The dynamic viscosity at 25±2° C. is measured using a Brookfield Model LV Viscometer, No. 1 spindle at 3 rpm. The dynamic viscosity in mPa s is recorded after allowing the spindle to rotate for 3 minutes.

Seawater Dynamic Viscosity. Sea water solution is prepared according to ASTM D1141-52 by dissolving 41.95 g of sea salt (ex Lake Products Co., Inc., Maryland Heights, Mo., USA) in 1 liter de-ionised water. A 300 mL portion of sea water solution is transferred to a mixing cup that is attached to a Hamilton-Beach 936-2 mixer (Hamilton-Beach Div., Washington, D.C.). The mixer speed control is set to low and a single fluted disk is attached to the mixing shaft. At the low speed setting, the mixer shaft rotates at approximately 4,000-6,000 rpm. A 0.86 g portion of xanthan gum is slowly added over 15-30 seconds to the mixing cup and allowed to mix for 5 minutes. The mixer speed control is set to high (11,000±1,000 rpm) and the test solution is allowed to mix for approximately 5 minutes. The mixture is allowed to mix for a total of 45 minutes, starting from time of xanthan gum addition. At the end of the 45 minutes mixing time, 2-3 drops of Bara-Defoam® defoaming agent (ex NL Baroid/NL Industries, Inc., Houston, Tex., USA) is added and stirring is continued for an additional 30 seconds. The mixing cup is removed from the mixer and immersed in chilled water to lower the fluid's temperature to 25° C.±0.5° C. In order to ensure a homogeneous solution, the solution is re-mixed after cooling for 5 seconds at 11,000±1,000 rpm. The solution is transferred from the mixing cup to 400 ml Pyrex beaker and Fann viscosity (Fann Viscometer, Model 35A) is measured. This is accomplished by mixing at 3 rpm. The reading is allowed to stabilise and then the shear stress value is read from dial and recorded as the Sea Water Dynamic Viscosity value at 3 rpm.

Hydration Rate. A Hydration Rate tester is used to measure the Hydration Rate of xanthan gum in an aqueous solution. Hydration Rate is defined as the amount of time for the sample to reach 90% of maximum torque using a torque load cell. While this does not directly measure full hydration, the 90% point is a useful metric for sample comparison. The 100% point obtained is more variable since the approach to the final value is gradual and is affected by even small amounts of random error in the measurement. The instrument utilises a variable speed motor to stir the solvent in a beaker that is mounted to a torque sensing load cell. The xanthan gum is added to the solvent while mixing at a constant speed to begin the test. As solution viscosity builds due to the hydration of the xanthan gum, the torque (twisting force) on the beaker increases. The torque values are continuously monitored by a computer which normalises, prints and plots the data in terms of percentage torque versus time. While torque is not a direct measure of the viscosity of the sample, torque provides a valuable measure of the viscosity development over time.

Hydration Rate Procedure: The test uses 80 mesh particle size xanthan gum, which is dispersed in polyethylene glycol (PEG) at a weight ratio of 3:1 and hand mixed at room temperature (23±2° C.). Samples to be tested are mixed with the dispersant immediately before the test is started. Standard tap water is prepared by dissolving 1.0 g of NaCl and 0.15 g $CaCl_2.2H_2O$ in 1 liter of de-ionised water. A volume of 130 mL is used in a 250 mL stainless steel beaker. Xanthan gum is tested at 1 wt %. The stirrer is a H-bar stirrer with the following dimensions: overall length 20.3 cm, length to cross member 17.8 cm, 3.8 cm×3.8 cm in 'H' (0.64 cm stainless dowel used). The H-bar stirrer has a 2-4 mm clearance from the bottom of the cup in order to mix the solution while maintaining a vortex in the solution. The direction of the 'H' is upright, and a shaft is connected to the 'horizontal bar' of the 'H'. The stirrer speed is set at 600 rpm. The sample is added over a 4-5 second period of time in a very controlled and constant fashion. For consistency and accuracy, the sample must not be added too fast or slow or in an uneven manner. The data are scaled from 0 to 100% of the maximum torque that occurs during the test. The time to reach 90% of maximum torque is taken as the Hydration Rate. This value is found to be stable and repeatable.

The hydrocolloid preferably comprises the xanthan gum as described and defined in WO 2012/030651 A1. A preferred fast dissolving xanthan gum is Keltrol AP or Keltrol APF, supplied by CP Kelco (Nijmegen, Netherlands). One of the advantages of using one or more of these preferred xanthan gums, is that the xanthan gum rapidly provides the required yield stress. In addition, the xanthan gum provides this effect within a broad temperature range of the water, which may be hot, ambient, or chilled dependent on the application. Opposite to this, especially native starches mostly need water at high temperature to gelatinise, at least at a temperature above the gelatinisation temperature.

The weight fraction of the hydrocolloid, preferably the xanthan gum, in the powder composition is usually at least 0.5 wt. %, based on dry weight, preferably at least 1.0 wt. %. The weight fraction of the hydrocolloid, preferably the xanthan gum, is usually 5 wt. % or less, in particular 4.0 wt. % or less, preferably 3.5 wt. % or less, more preferably 3.0 wt. % or less. Preferably at least 25 wt. %, in particular at least 50 wt. % of the total hydrocolloid content in the powder composition is formed by one or more thixotropic hydrocolloids, more preferably 90-100 wt. % of the total hydrocolloid content, in particular 95-100 wt. % of the total hydrocolloid content.

In a particularly preferred embodiment, 50-100 wt. % more in particular 90-100 wt. %, even more in particular 95-100 wt. % of the hydrocolloid content is formed by one or more xanthan gums, preferably by one or more xanthan gums referred to herein as preferred xanthan gums.

A powder composition of the invention, respectively a food composition according to the invention preferably is essentially free of added pregelatinised starch. If present, the concentration of pregelatinised starch usually is less than 0.5 wt. %, in particular 0.1 w. % or less, based on dry weight.

Preferably a powder composition of the invention, respectively a food composition according to the invention is essentially free of added root starch and added tuber starch.

The gas release agent may be any gas release agent capable of generating gas bubbles that are entrapped in the bulk of the food product prepared from a composition according to the invention. Preferably the gas release agent releases at least 1 milliliter of gas (when reconstituted in water having a temperature of 85° C., at 1 bara pressure, hereafter referred to as 'standard conditions'), per gram of dry gas release agent, more preferably the gas release agent releases at least 2 milliliter of gas at standard conditions per gram of dry gas release agent, even more preferably at least 5 ml per gram of dry gas release agent, in particular at least 10 ml per gram of dry gas release agent. Usually, the gas release agent releases 20 ml gas per gram of dry gas release agent or less, when reconstituted in water, in particular.

Usually, the amount of water to the amount of gas release agent, based on the gas volume at 1 bara and 25° C. provided by the gas release agent when all gas is released is at least 1 ml gas/100 ml liquid product (i.e. 1% overrun), preferably said amount ranges from 5 ml gas/100 ml liquid product (i.e. 5% overrun) to 100 ml gas/100 ml liquid product (i.e. 100% overrun).

In an embodiment, the gas release agent is a gas-containing gas release agent. Such agent contains a gas phase entrapped in a matrix. The gas-containing gas release agent are typically particles containing closed pores in which the gas phase is present. Usually, such porous particles are prepared by a spray drying technique applying gas injection in a liquid feed to be atomised typically via the use of a high pressure atomisation nozzle. The gas-containing gas release agents may contain particles holding non-pressurised gas (wherein the gas pressure in the internal voids is about 1 bara), such as non-pressurised spray dried foamers. Such foamers are generally known in the art, and described in detail in, for instance, U.S. Pat. No. 4,438,147 or EP-A 458,310.

Good results have been achieved with a gas release agent comprising particles containing a pressurised gas, i.e. having a pressure of more than 1.0 bara, in particular of 1.5 bara or more. Such gas release agents are e.g. known from WO 2006/023564, EP 2 025 238 A1 and references cited therein. Other examples of gas release agents containing particles holding a gas are given in EP-A 1538924, WO 2006/023565 and US 2011/0212242.

Gas-containing gas release agents, typically comprise a solid matrix material (i.e. solid at least at 25° C.) in which internal voids are present, wherein the gas is entrapped. The solid material may comprise any edible solid material, in particular any substance selected from the group of carbohydrates, proteins, fats and emulsifiers.

Particularly suitable as a source for the protein for the solid material of the gas-containing gas release agent are skim milk powder, whey protein concentrate, whey powder, caseinate, and the like.

Particularly suitable as vegetable fat for the gas release agent are palm kernel fat, coconut fat and the like.

Preferred carbohydrates for the gas release agent include oligosaccharides obtainable by hydrolysing starch (hydrolysed starches), in particular hydrolysed starches having a DE of 10-45, glucose syrup, maltodextrins and lactose. nOSA-starch (n-octenyl succinyl anhydride modified starch of "hydrophic" starch) is another preferred carbohydrate.

In an advantageous embodiment, the solid material for the gas release agent at least substantially consists of a carbohydrate, in particular a maltodextrin and/or nOSA starch. In a specific embodiment, the carbohydrate content of the gas release agent is 90-100% based on dry weight.

In a further advantageous embodiment, the solid matrix material for the gas release agent comprises a protein, optionally in combination with a carbohydrate, in particular a maltodextrin. The presence of a protein is advantageous at least in some applications in that it may contribute to bubble-dispersion properties of the product.

In a specific preferred embodiment, the gas release agent comprises pressurised gas, in particular air or nitrogen, and the matrix material is formed by a protein and a maltodextrin, plus optionally nOSA starch.

The gas in a gas-containing gas release agent (pressurised or non-pressurised may be any gas that is used in the context of food products, such as air, oxygen, nitrogen, carbon dioxide, nitrous oxide, or mixtures of these. Preferably the gas is nitrogen or a mixture of nitrogen and oxygen, such as air.

The gas-containing gas release agent may further contain one or more plasticizers to improve the robustness of the solid matrix material. The presence of one or more plasticizers is in particular preferred for gas release agent containing pressurised gas. If present, the plasticizers are preferably selected from the group consisting of polyols or sugar alcohols, such as glycerol, mannitol, sorbitol, lactitol, erythritol, trehalose and/or lipids other than fat, such as fatty acids, monoglycerides, phospholipids.

In particular, the gas release agent may further include additional stabilizing agents to increase the dispersion stability of the bubbles in the bulk of the food product., to stabilise pH or to prevent protein from flocculation (after reconstitution).

Preferred stabilisers are sodium or potassium citrates and orthophophates.

Further, a free flowing aid may be present, preferably silicon dioxide or tricalcium phosphate.

The presence of an emulsifier (in addition to or as an alternative to an emulsifying protein) may be advantageous to facilitate dispersion of gas bubbles. If present, the emulsifier preferably has a HLB-value of at least 7, preferably at least 10. Alternatively or additionally, the instant food ingredient (such as the flavour component) contains an emulsifier, in order to readily disperse the gas bubbles. Preferably the emulsifier has a HLB-value of at least 7, preferably at least 10. If an additional emulsifier is desired, sodium stearoyl-2-lactylate or a sucrose ester, for example sucrose ester SP70 supplied by Sisterna, may in particular be present.

The gas-containing gas release agent usually has a loose bulk density of at least 150 g/l. Usually the loose bulk density is 350 g/l or less, in particular in the range of 180-300 g/l, more in particular 200-240 g/l. A density within this range can be obtained by the person skilled in the art using known technology. For instance use can be made of gas injection into the aqueous feed slurry just before atomisation, which is done preferably with nitrogen gas. This allows preparation of products of such lower densities. Such particles typically have porous structures, in particular containing voids in the range of 1-30 micron.

In an alternative embodiment, the gas release agent is a chemical gas release agent, instead of a gas-containing gas release agent.

Chemical gas release agents form gas in situ when dissolved or dispersed in water. Preferred chemical gas release agents contain a gas generating compound that release carbon dioxide when contacted with water, optionally in the presence of an added acidulant. Such gas release agents are generally known in the art, and described in detail in for instance WO 98/34495. Preferred gas generating compounds are carbonate salts and bicarbonate salts, hereafter also referred to as (bi)carbonate.

The (bi)carbonate can be of any food grade carbonate or bicarbonate salt, preferably bicarbonate salt. An advantage of bicarbonate resides in its decomposition properties. At least in some applications, in particular in formulations for acidic food products, a considerable contribution to gas release is achievable by contact with (hot) water without requiring additional acidulant (in addition to acid that may be present in the flavour/aroma component, such as coffee drink component). Usually the carbonate or bicarbonate salt is a sodium or potassium salt. Potassium is preferred from a health- and taste perspective.

However, in order to have a relatively high gas release rate with a chemical gas release agent based on a (bi)carbonate, it is advantageous to include an added acidulant. In principle, any food-grade acidulant may be used. This acidulant can be organic or inorganic. An example of a suitable organic acid is citric acid. In particular, preferred is an acidulant that reacts from a non-acidic component to a acidic component in the presence of water, such as being glucono-delta-lactone (GDL). Herewith the release rate of the gas can be controlled and matched with the rate at which the hydrocolloid dissolves or disperses in the water of other aqueous liquid (and thus the rate at which the yield stress is increased).

In a specific embodiment, the chemical gas release agent comprises (i) a carbonate salt and/or a bicarbonate salt and (ii) an acidulant and/or an amphiphilic substance. This way carbon dioxide is released upon the addition of water by chemical reaction between the carbonate salt and/or bicarbonate salt and the acidulant and/or amphiphilic substance.

Preferably the combination of carbonate salt and/or bicarbonate salt and acidulant and/or amphiphilic substance comprises agglomerates of carbonate salt and/or bicarbonate salt particles and particles of the acidulant and/or amphiphilic substance. Preferably bicarbonate salt or carbonate salt particles are partially or fully coated with the amphiphilic substance. Preferably the amphiphilic substance is a salt of a fatty acid, preferably a bivalent salt of a fatty acid, more preferably a calcium or magnesium salt of a fatty acid. Preferably the amphiphilic substance is the salt of an unbranched or branched fatty acid have 6-24 carbon atoms, in particular of a saturated unbranched or branched fatty acid have 6-24 carbon atoms, more preferably a stearate salt. Examples of this kind of chemical gas release agents can be found in WO 2011/114151.

Alternatively, the composition comprises in addition to the combination of a carbonate salt and/or bicarbonate salt a water-soluble acidulant. The acidulant preferably comprises an organic acid such as citric acid, or glucono delta-lactone.

A chemical gas release agent, such as a (bi)carbonate, is in particular suitable for preparing a liquid with a neutral or acidic pH after reconstitution in water. The pH is preferably lower than neutral pH and higher than the acidic pH at which the protein component, if present, will flocculate or becomes (partly) insoluble. In general, after reconstitution in hot water the pH is between about neutral pH and an acidic pH of up to 2 unit below neutral pH, in particular up to 1 unit below neutral pH. Typically, the apparent pH (the pH measured with a standard pH electrode at about 65° C.) is 7 or less, preferably 5-7.0, in particular 6-7.0, more in particular 6.2-6.7.

Preferably, at least 90 wt. % of the gas release agent particles is formed by particles having a size less than 200 µm, more preferably essentially all particles have a size of less than 200 µm, as determined by a screen test method, using a 200 µm (60 mesh) screen.

Preferably, at most 85 wt. % of the particles is formed by particles having a size of 75 µm or more, as determined by a screen test method, using a 75 µm (200 mesh) screen. The weight fraction of the gas release agent in the powder composition is usually at least 5 wt. %, based on dry weight, preferably at least 10 wt. %. The weight fraction of the gas release agent is usually 50 wt. % or less, preferably 30 wt. % or less.

The gas release agent content of a powder composition according to the invention usually is at least 1 wt. %, based on total weight, preferably at least 5 wt. %, in particular at least 10 wt. %, more in particular at least 25 wt. % or at least 50 wt. %. The gas release agent content of a powder composition according to the invention usually is 95 wt. % or less, preferably 90 wt. % or less, in particular 80 wt. % or less. In a specific embodiment, the gas release agent content is 50 wt. % or less.

The powder composition further comprises an instant food component, i.e. the food ingredients other than the hydrocolloid and the gas release agent. This component is suitably selected from any known food ingredients for use in a specific application, e.g. instant coffee for a coffee-based food product or cocoa for a cocoa-based product. The instant food ingredients are in particular selected from the group of flavours, aromas, nutrients (protein, carbohydrate, fats, minerals, vitamins, trace elements, antioxidants, etc.), acidulants, stabilizing agents, colourants. In particular, in a composition for a coffee drink, the instant coffee is considered to contribute to the formation of a gas with desirable properties, in particular in case a chemical gas release agent is used also in the absence of additional acidulant. In particular, for a coffee drink, instant coffee comprising *Arabica* coffee (preferably 50-100 wt % based on total coffee component) is advantageous for use in a composition according to the invention.

The amount(s) of the food ingredient(s) can suitably be chosen based upon common general knowledge, the information disclosed herein the content of the cited prior art and optionally a limited amount of routine testing.

Usually, the total amount of the instant food component forms more than 1 wt. %, based on dry weight of the powder composition, in particular at least 10 wt. % more in particular at least 15 wt. %. Usually the total amount of the instant food component is 90 wt. % or less, in particular 60 wt. % or less, more in particular 40 wt. % or less.

The weight ratio of the instant food component (i.e. the total of instant food ingredients other than the gas release agent and the hydrocolloid in the powder composition) to the gas release agent usually is at least 0.01, preferably at least 0.02, in particular at least 0.03, more in particular at least 0.05. Usually, the weight ratio of the instant food component to the gas release agent is 20 or less, preferably 5 or less, in particular 1 or less, more in particular 0.5 or less.

The weight ratio of the hydrocolloid to the instant food component usually is at least 0.005, preferably at least 0.05, in particular at least 0.10. The weight ratio of the hydrocolloid to the instant food component usually is 10 or less, preferably 5 or less, in particular 1 or less, more in particular 0.5 or less, even more in particular 0.3 or less.

Preferably the dry powder mixture has a moisture content of at most 5%.

A preferred food composition according to the invention is a coffee drink, such as a milk coffee. Further, preferred products include soft drinks, juices, infant and toddler food, chocolate drinks, desserts and milk drinks.

Preferred desserts are selected from the group of puddings, vla, liquid yoghurts, non-liquid yoghurts, and cottage cheese.

Preferred spoonable products are whipped cream, mousse, cottage cheese and (non-fluid) yoghurt, such as Turkish-style yoghurt.

In a method for preparing a food composition according to the invention, the powder composition is typically mixed with water or another aqueous liquid, e.g. milk. The aqueous liquid may be poured onto the powder composition (present in a cup or other holder from which the product can be consumed). Alternatively the powder composition is added to the aqueous liquid.

The temperature of the aqueous liquid used in a method for preparing a food composition according to the invention is typically in the range of 0-100° C. The aqueous liquid preferably has a temperature that allows immediate consumption of the product. Thus, in particular for a product to be consumed hot preferably hot liquid is used, such as a temperature in the range of 60-100° C., in particular in the range of 70-95° C. In particular for a product that is to be consumed at room temperature or below, the temperature of the liquid preferably is in the range of 0-30 C, in particular in the range of 4-25° C.

Usually, the weight to weight ratio powder composition to water is in the range of 1:200 to 1:1. In particular said ratio is at least 1:30. In particular, said ratio is 1:5 or less.

In a specific embodiment, the powder composition is for preparation of a food product, in particular a beverage, in a vending machine. Accordingly, in a specific embodiment, the invention extends to a vending machine comprising a powder composition according to the invention, respectively to a method for preparing a food composition comprising mixing the powder composition with water to provide the food composition, in particular the beverage.

Usually, the concentration of the hydrocolloid in a food product containing gas bubbles in the bulk according to the invention is at least 0.1 mg/g product, preferably at least 0.5 mg/gram product. It is an advantage of the present invention that a relatively low amount of the hydrocolloid suffices to retain bubbles in the bulk of the product. A concentration of 5 mg/g or less is usually sufficient. Preferably the concentration of the hydrocolloid is 2 mg/g product or less.

A food product according to the invention (obtainable by a preparing a food product by reconstituting the powder composition of the invention in an aqueous liquid) contains gas bubbles dispersed in the bulk of the food product.

Preferably, the composition maintains gas bubbles throughout the bulk of the product for at least 10 minutes preferably at least 15 minutes, preferably at least 20 minutes, preferably at least 30 minutes, after its preparation.

Usually, the gas bubbles constitute at least 1% of the volume of the food, preferably at least 3% of the volume of the food, in particular at least 5% of the volume of the food, more in particular at least 10% of the volume of the food. Usually, the gas bubbles constitute 50% or less of the volume of the food product, in particular 40% of the volume of the food product or less.

The invention is in particular advantageous, in that it provides a product wherein at least 90% of the gas volume, is formed by gas bubbles having a diameter of 300 micrometer or less, preferably 200 micrometer or less, in particular 100 micrometer or less. Preferably, this is the case for at least 10 min, preferably at least 15 min, more preferably at least 30 min after preparation of the food product.

Usually, at least 90% of the gas volume in a food product of the invention is formed by gas bubbles having a diameter 10 micrometer or more, in particular of at least 40 micrometer, more in particular of at least 50 micrometer.

In a further aspect the present invention provides a method for keeping gas bubbles in bulk liquid by using a hydrocolloid in particulate form that provides an apparent yield stress of at least 0.3 Pa, preferably of at least 0.5 Pa, within a period of 60 seconds after the addition of water to reconstitute the hydrocolloid. Preferred embodiments disclosed in the context of this invention, are applicable here, mutatis mutandis.

In an embodiment, the powder composition according to the invention is prepared by dry-blending the gas release agent in particulate form, the hydrocolloid, such as a xanthan gum, in particulate form and the food component in particulate form.

In a further embodiment the powder composition is prepared by providing a blend of the gas release agent in particulate form and the hydrocolloid in particulate form and said blend is dry-blended with the food component in particulate form.

Suitable dry-blending methods are known in the art and include dry blending, dry extrusion and dry tumbling, agglomeration or granulation.

The following examples illustrate the present invention.

EXAMPLE 1

Cold Instant Aerated Drink

A powder composition for a frappuccino type of drink was made by mixing 2 g of instant coffee and 9 g of gas release agent (3 g of Cappa B01 and 6 g of Cappa CS10, both supplied by Kievit, Meppel, NL), 0.3 g thixotropic xanthan gum (Keltrol AP-F (supplied by CP Kelco)). The mixture was put in a glass (250 ml glass with a diameter of 60 mm). 150 ml of cold (5° C.) semi-skimmed milk was added and stirred for 30 seconds. The thus produced drink had an overrun of 37%. The drink remained free of a visible foam layer on top of the product for at least 15 min.

EXAMPLE 2

Hot Instant Aerated Drink

A powder composition for a Café Latte type of drink was made by mixing of 2 g of instant coffee, 9 g of gas release agent (3 g of Cappa BO 1 and 6 g of Cappa CS10, both supplied by Kievit, Meppel, NL), 0.3 g of Keltrol AP-F. The mixture was put in a glass (250 ml glass with a diameter of 60 mm). 150 ml of hot (85° C.) water was added and stirred for 30 seconds. The thus produced drink had an overrun of 33%. The drink remained free of a visible foam layer on top of the product for at least 15 min.

COMPARATIVE EXAMPLE 1

Example 1 was repeated, except that the Keltrol AP-F was replaced by the same amount of either a non-thixotropic xanthan (Keltrol RD CP Kelco)) or a cold swellable potato starch (Prejel, supplied by Avebe).

Within less than 10 min., a thick layer of foam on top of the beverage had developed on both the drink comprising Keltrol RD and the drink comprising Prejel.

COMPARATIVE EXAMPLE 2

Example 1 was repeated with the Keltrol AP-F replaced by 4 g of Prejel. FIG. 1 shows that about 5 min after preparation of the beverage for the sample containing the prejel (left) a thick foam layer had developed whereas the product according to Example 1 (right) did not contain a visible foam layer on top of the bulk of the product.

COMPARATIVE EXAMPLE 3

Figure 2:
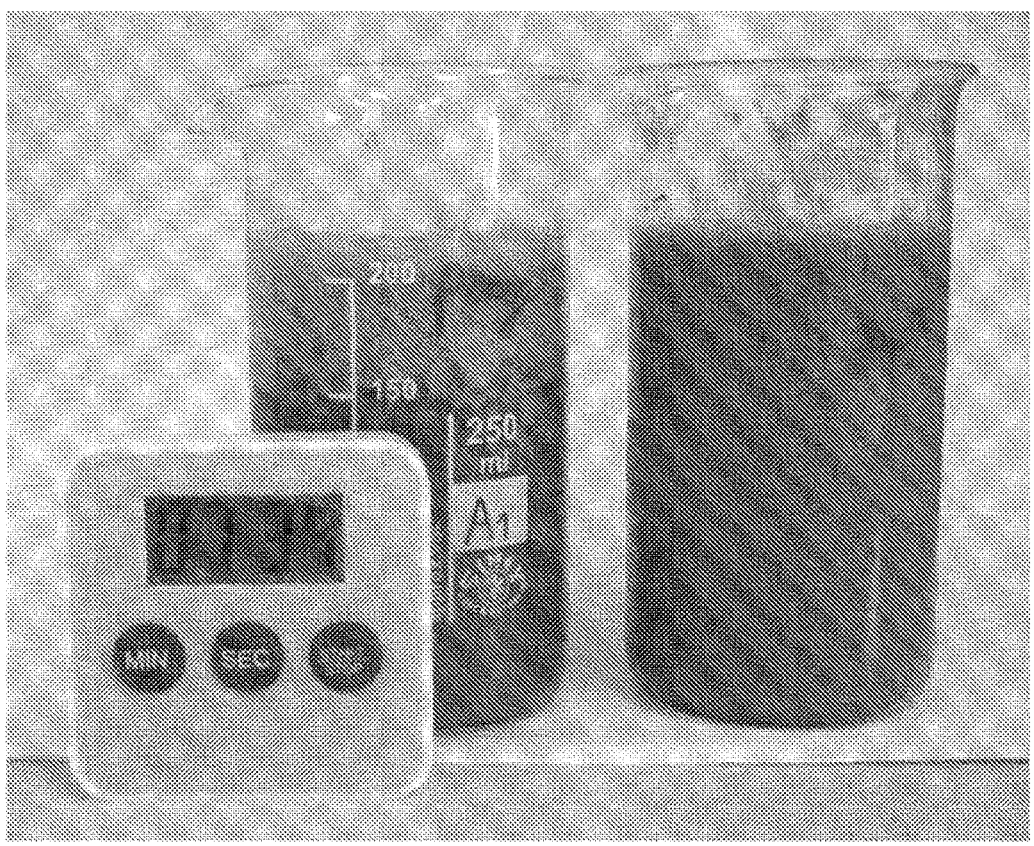

Example 2 was repeated with the Keltrol AP-F replaced by 4 g of Prejel. FIG. 2 shows that about 8 min after preparation of the beverage for the product containing the prejel (left) a thick foam layer had developed whereas the product according to Example 2 (right) did not contain a visible foam layer on top of the bulk of the product

EXAMPLE 3

Determination of Yield Stress Under Dynamic Conditions

In this experiment model premixes have been prepared containing the relevant hydrocolloid (either 0.2 g, 0.4 g, or 4 g), together with icing sugar (sucrose, 5.0 gram) and erythritol (2.0 g) to prevent lumping of the dry hydrocolloid. The premix is dry mixed well, and subsequently put into a tall form 300 ml glass beaker.

Three different types of precision plastic spheres (The Precision Plastic Ball Company Ltd., UK) were added to the premix in the beaker. These spheres are:
 high density polyethylene (HDPE) spheres, diameter of 3.17 mm coloured green, density of 0.952 g·cm$^{-3}$,
 high density polyethylene (HDPE) spheres, diameter of 5.69 mm coloured bright red, density of 0.952 g·cm$^{-3}$,
 polystyrene (PS) sphere, diameter of 4.76 mm, coloured dark red, density 1.04 g·cm$^{-3}$.

The size and density of the spheres was chosen in such a way that they would behave like gas bubbles of approximately 0.1 mm (4.76 mm PS sphere), 0.2 mm (3.17 mm HDPE sphere), and 0.3 mm (5.69 mm HDPE sphere). The differences to bubbles are that the terminal velocity of the probe spheres will be an order of magnitude bigger in a Newtonian fluid and that the PS sphere is going to sediment instead of cream.

For the experiments with xanthan gums, 150 g of water at ambient temperature was poured on top of the premix and was vigorously stirred by hand with a metal spoon for 30 seconds. The density of the final solutions was (1.014±0.001) g·cm$^{-3}$. Xanthan gum's behaviour was independent of the water temperature.

For the experiments with modified starches, 150 g of hot water (just after boiling) was poured on top of the premix and was vigorously stirred by hand with a metal spoon for 30 seconds. Here hot water was used, in order to gelatinise the starch and make it functional. The density of the final solutions is (1.023±0.001) g·cm$^{-3}$.

The test is based on the principle that: after the stirring the spheres will be suspended at a certain height in the liquid, and depending of the yield stress generated by the hydrocolloid, they will slowly move upward, or downward, or they will remain at its place. The higher the yield stress, the slower the spheres will move.

The test is carried out as follows:
The beaker is positioned on a stand and pictures are taken at fixed time intervals for 5 minutes. This way the movement of the spheres can be followed in time. The translation of the spheres relative to its starting position can be plotted as function of time in a graph. In case the processes are too fast to be captured on pictures, a video record is made instead.

If there is no yield stress in the system, the spheres will move with a constant velocity through the liquid. If sufficient yield stress is developed by the time the picture taking will have commenced the spheres will stay motionless. If yield stress is developing during the time of the experiments, the spheres' motion is going to be decelerative, i.e. they will slow down and eventually stop moving. The trajectories of the spheres in the experiments described above are measure using video imaging software ImageJ. As a result we get the translation of each type of sphere with time in the studied system.

The following experiments were performed.

TABLE 1

Description of experiments with precision spheres.

| Exp. | Hydrocolloid type | Hydrocolloid amount [g] | Hydrocolloid concentration* [wt %] |
|---|---|---|---|
| 3-1 | Keltrol AP-F | 0.2 | 0.13 |
| 3-2 | Keltrol AP-F | 0.4 | 0.25 |
| 3-3 | Keltrol AP | 0.2 | 0.13 |
| 3-4 | Keltrol AP | 0.4 | 0.25 |
| 3-5 | Keltrol RD | 0.2 | 0.13 |
| 3-6 | Keltrol RD | 0.4 | 0.25 |
| 3-7 | Prejel VA70 | 4.0 | 2.5 |
| 3-8 | Eliane SC160 | 4.0 | 2.5 |

*corrected for the icing sugar and erythritol

Figures 1, 3:
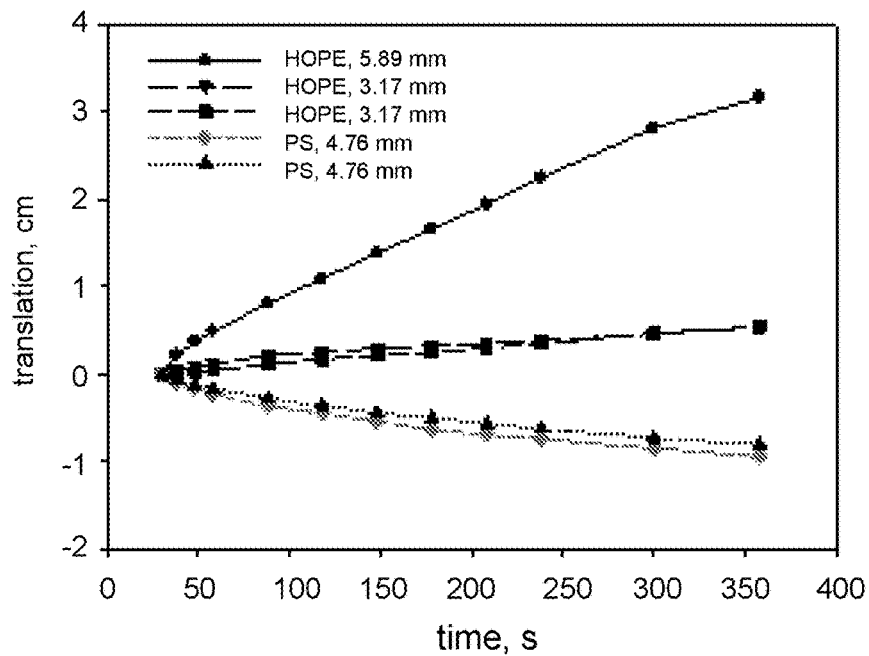
Figures 2, 3:
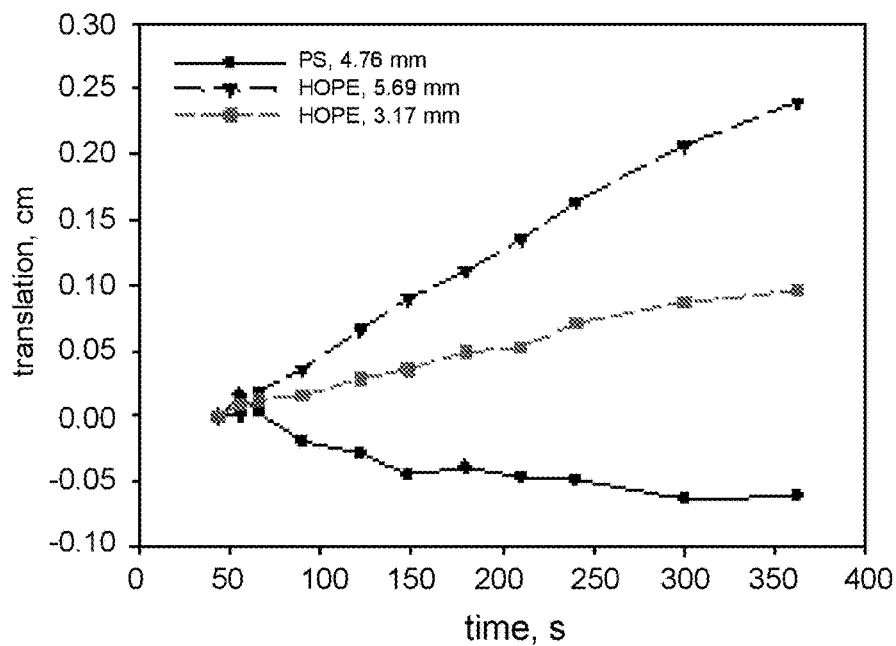
Figure 3:
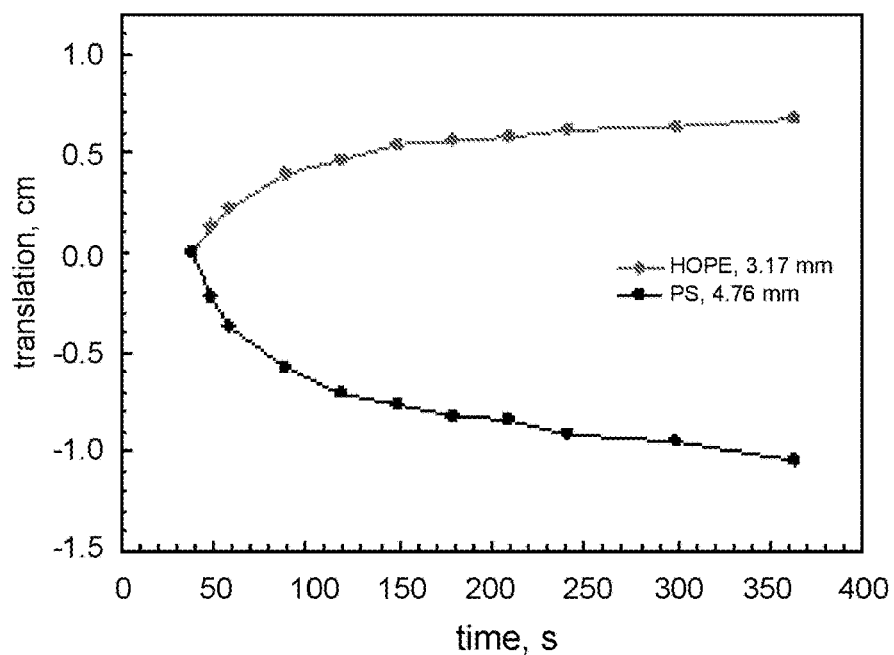
Figures 3, 4:
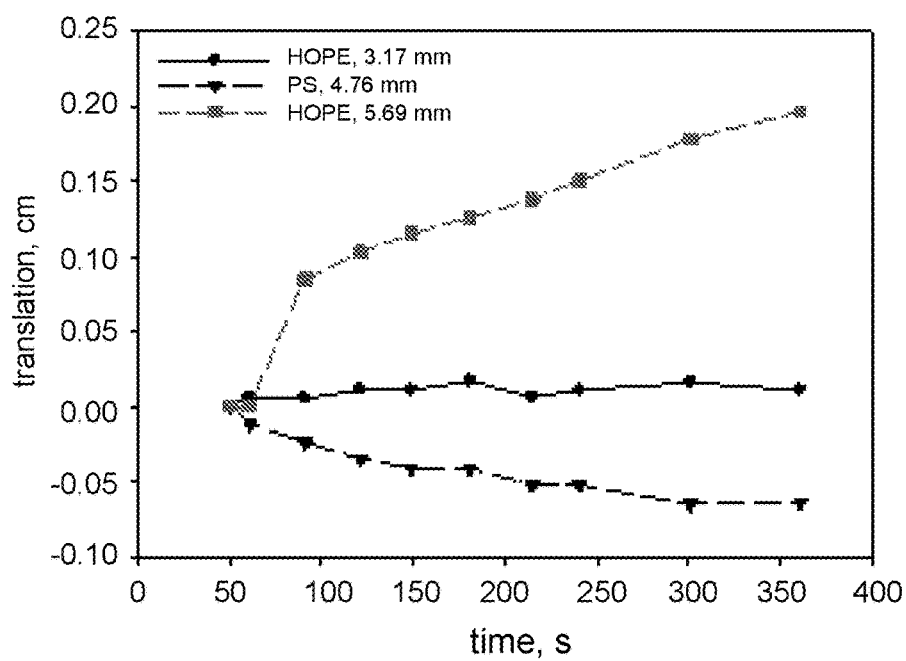
Figures 3, 4, 5:
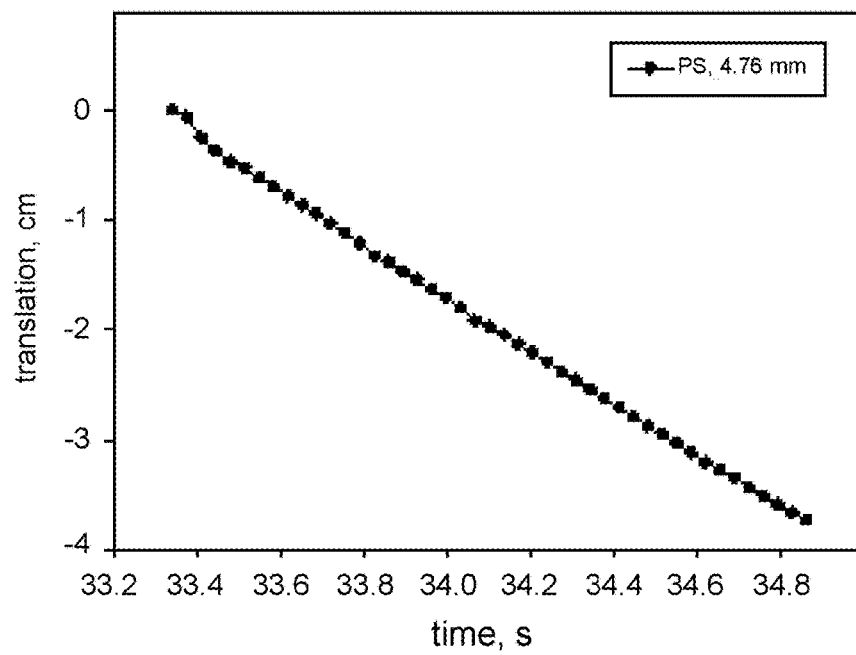
Figures 3, 4, 5, 6:
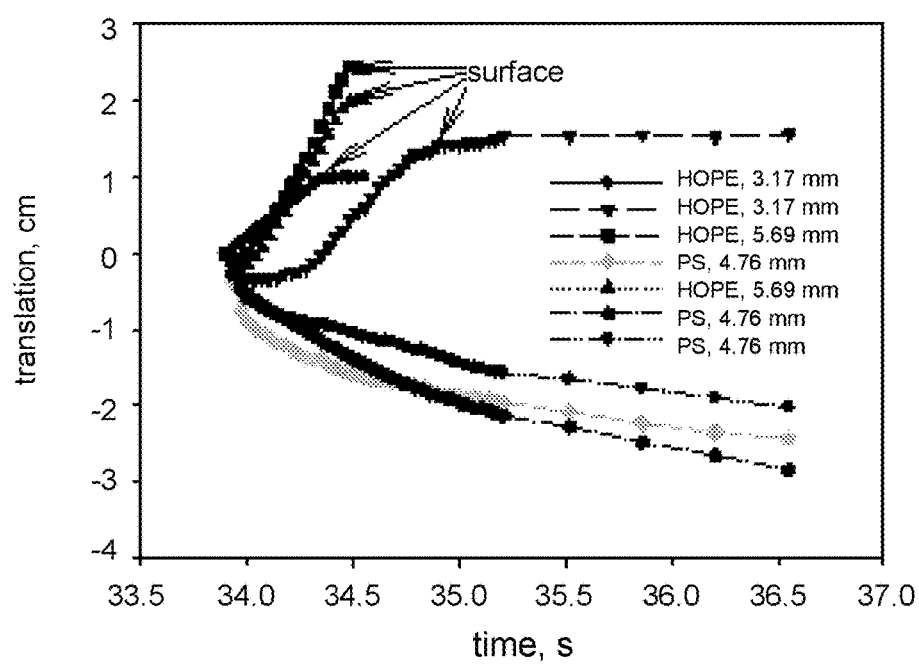
Figures 3, 4, 5, 6, 7:
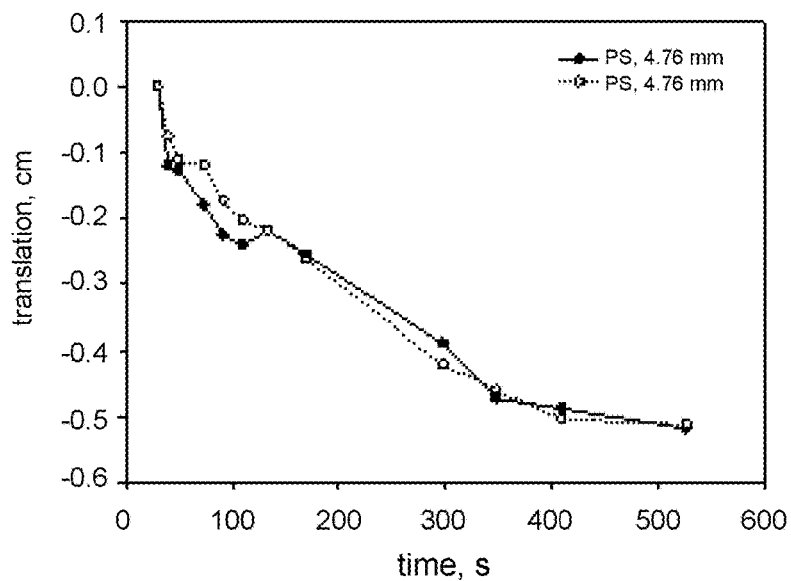
Figures 3, 4, 5, 6, 7, 8:
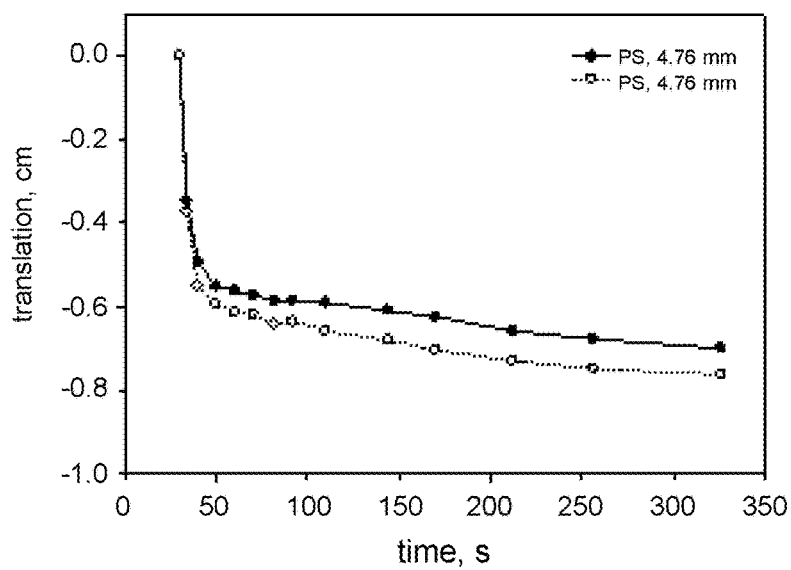

The movement of the spheres in each experiment has been plotted in various graphs in FIG. 3 (FIG. 3-1 till 3-8). In some cases duplicate measurements are shown, wherein two similar spheres are followed. In general reproducibility is very good, as the trajectories of these two spheres almost coincide.

In experiment 3-1 the largest sphere translates the most from its initial position, as compared to the other spheres. The smaller spheres only have a small translation.
 In experiment 3-2 the concentration of hydrocolloid has doubled, and the spheres nearly do not move. The maximum measured translation is about 0.25 cm. This shows that the yield stress in this system is high enough to suspend the spheres.
 In experiment 3-3 the yield stress did not develop rapidly enough to keep the largest sphere suspended, this sphere floated to the surface. The smaller spheres initially show a relatively rapid movement, which then decelerates because of the development of sufficient yield stress to keep the small spheres suspended.
 In experiment 3-4 the translation was very small, like in experiment 3-2. The yield stress that develops This shows that the yield stress in this system is high enough to suspend the spheres.
 In experiment 3-5 the behaviour of the spheres is different than in the previous experiments. The HDPE spheres rapidly moved to the surface of the liquid, and the PS sphere sedimented within 2 seconds. This is shown in FIG. 3, where the translation of the particle lies on a straight line with a constant slope. This is indicative of typical Newtonian fluid rheology. Keltrol RD does not have any effect on dissolution or yield stress development.
 In experiment 3-6 the spheres show similar behaviour as in experiment 3-5, although the time scale is different. the HDPE particles initially accelerate, and after that move with constant velocities until they surface. This is a typical behaviour of probe particles in Newtonian fluid, and this shows that the presence of Keltrol RD in the solution does not lead to the development of yield stress large enough to oppose the buoyancy force acting on the HDPE particles. The PS particles show different behaviour: they initially decelerate and then move at constant velocities. The initial deceleration might be due to the nature of the experiment. In this case the PS particle were thrown into the solution after the video recording had started, i.e. they had some initial non zero velocity when they contacted the solution. Therefore, they decelerated due to the viscous drag of the solution. After the initial period of time all three PS particles moved with the same constant velocity during the time of the measurement, showing the same Newtonian behaviour of the surrounding solution.

In experiment 3-7 the HDPE spheres rapidly moved to the surface of the liquid, while the PS spheres only showed limited movement, as shown in FIG. 3 (duplicate measurement). The yield stress was sufficient to suspend the PS spheres.

Also in experiment 3-8 similar behaviour of the spheres was observed. The HDPE spheres rapidly moved to the surface, while the PS spheres remained suspended during the experiment, see FIG. 3 (duplicate measurement). Therefore the modified starches can be used to keep spheres suspended in the bulk liquid, at a much higher concentration though than the Keltrol AP and Keltrol AP-F.

EXAMPLE 4

Preparation of a Coated Gas Release Agent According to the Invention

As starting product (uncoated gas release agent) a gas release agent as described in WO 2006/023564 was used. This product can be obtained from FrieslandCampina Kievit under the name Vana Cappa B01. The product consists of a powder containing 88 wt. % of maltodextrin 18DE, 8 wt. % of n-OSA starch and 4 wt. % of silicon dioxide. The powder matrix contains entrapped pressurised nitrogen gas.

The production of coated gas release agent was done in high shear mixer (Cyclomix by Hosokawa Micron BV, Doetinchem, The Netherlands). The starting product was heated to 45° C. in the high shear mixer. Then 10% of hydrophobic coating material (palm fat, the product marketed by Loders as Revel A) was added to the starting product. The blend was heated to 55° C. and mixing was continued for 25 minutes. After 25 minutes of mixing, the powder mixture is cooled down to room temperature.

Using CARS (Coherent Anti-stokes Raman Spectroscopy) microscopy it was confirmed that the process resulted in with a fat coating on at least a substantial part of the surface of the matrix material phase of the gas release agent particles.

EXAMPLE 5

This Example provides a hot chocolate type of drink. A powder mixture was made consisting of 17 g of instant chocolate mix (supplied by Heimbs) and 0.3 g of Keltrol AP-F (supplied by CP Kelco). To this mixture 3 gram of the following gas-releasing agents were added:

Sample 1: Vana Cappa B01 (supplied by Friesland-Campina—Kievit) coated with 10 wt. % fat (Revel A, a palm fat with a melting point around 60° C. supplied by IOI Loders Croklaan).

Sample 2 (comparative example): Vana Cappa B01.

Sample 1 was coated in a Cyclomix mixer (supplied by Hosokawa). The Vana Cappa B01 was heated to 55° C. in the mixer. Then the appropriate amount of coating was added to the Vana Cappa B01. The blend was heated to 60° C. and was mixed for 5 minutes. After mixing, the powder mixture was cooled down to room temperature.

The mixtures were put in glasses (250 ml glass with a diameter of 60 mm). 150 ml of hot (85° C.) water was added to each glass and stirred for 30 seconds. The overruns and foam heights obtained are given in Table 2. Tests were performed about 1 month after production of the samples. At that point in time sample 6 had lost most of its gas. This is explainable because gas is expected to leak through the fat droplets.

TABLE 2

| Sample | Overrun (%) | Foam layer at 5 min (mm) | Foam layer at 15 min (mm) |
|---|---|---|---|
| 1 | 16 | 4 | 4 |
| 2 | 17 | 15 | 14 |

Table 2 shows that the hot chocolate prepared from the coated gas releasing agent in which the coating consists of fat lead to the formation of a much thinner foam layer on top of the bulk phase after 5 and after 15 min. From this it can be understood that coating the gas release agent with a fatty substance is a way to increase the extent to which formed gas bubbles remain entrapped in the continuous phase in a product of the invention.

EXAMPLE 6

This Example shows a hot instant aerated drink, in this case a Café Latte type of drink. A powder mixture was made consisting of 2 g of the fat coated powder of Example 5, 0.3 g of Keltrol AP-F and 6 g of Vana Cappa 25 C (supplied by FrieslandCampina Kievit and composed of 25% coconut fat1 8% lactose, 54.4% Skim Milk Powder, 0.6% Disodiumphosphate, 0.1% $SiO_2$). Further a similar mixture was made, but with the uncoated gas release agent (Vana Cappa B01)

The mixtures were put in a glass (250 ml glass with a diameter of 60 mm). 150 ml of hot (85° C.) water was added and stirred for 30 seconds. The thus produced drinks had an overrun of around 18%. For both samples, no clear layer of foam could be detected about 5 min after preparation., although for the drink made from the mixture containing the uncoated gas release agent some diffuse layering was visible after 5 min. For the drink made from the mixture containing the coated gas release agent, no layering was observed after about 5 min. Further, 15 min after preparation, for the latter drink still no foam layer could be seen. This illustrates that both with powder compositions comprising coated gas release agents an with powder compositions comprising uncoated gas release agents satisfactory aerated hot drinks can be prepared, and that a coating can be applied for improved properties.

EXAMPLE 7

Coating of Gas Release Agent with Sucrose Fatty Acid Ester

Gas release agent was coated with 5% sucrose fatty acid ester. This sample was prepared similarly as described in Example 4. The gas release agent was heated to 55° C. in the mixer. Then the appropriate amount of coating material was added to the powder. The blend was heated to 55° C. and mixed for 25 minutes. After mixing, the powder mixture was allowed to cool down to room temperature.

Another sample was prepared containing 5% sucrose fatty acid ester in the bulk of the particles of the gas release agent. A dispersion of 95% maltodextrin and 5% sucrose fatty acid ester was sprayed at a temperature of 80° C. at a rate of around 100 L/h, with simultaneous injection of nitrogen gas close to the nozzle, at a pressure of about 100 bar. Drying was performed at a temperature of 136° C., followed by 55° C. The density of the powder was around 220 g/liter and the average particle size was around 200 micrometer. Subsequently the powder was loaded with gas by loading a vessel with the dry powder and free flowing agent, pressurising with nitrogen at 35 bar and about 30° C. Subsequently the vessel was heated to above 140° C. for at least 15 minutes. Subsequently, the vessel was cooled to about 40° C., and depressurized.

EXAMPLE 8

Gas Release Agent Coated with Sucrose Fatty Acid Ester

The bubble size distribution was determined of uncoated gas release agent, and gas release agent coated with 5% sucrose fatty acid ester and gas release agent with 5% sucrose fatty acid ester dispersed in the particle matrix (from Example 7). Dry mixtures were prepared containing 10 gram of dry soup mix 1; 2 gram of the respective gas release agent; and 0.2 gram of xanthan gum (Keltrol AP-F). These powders were well mixed to prepare homogeneous dry mixtures. Immediately thereafter 150 mL of hot water (just after boiling) was added to the mixture and manually stirred for 30 seconds.

The bubble size distribution of samples taken at various times was determined. The results are given in the following table.

TABLE 3

Average bubble size (d3.2) of gas bubbles in mushroom soup containing coated (5% sucrose fatty acid ester) or 5% sucrose fatty acid ester dispersed in particle matrix, or uncoated gas release agent.

| Time [min] | Dispersed 5% d3.2 [μm] | Coated 5% d3.2 [μm] | Uncoated d3.2 [μm] |
| --- | --- | --- | --- |
| 1 | 143 | 147 | 174 |
| 10 | 195 | 191 | 183 |
| 20 | 208 | 202 | 200 |
| 30 | 195 | 195 | 210 |

This shows that in particular during the first 10 minutes the bubble size of the gas release agents either coated with sucrose fatty acid ester or sucrose fatty acid ester dispersed in the particle matrix is smaller than the size of the bubbles of the uncoated gas release agent. This is in particular interesting, because during this time the consumer will consume the instant soup mix, when it is still warm. Smaller bubbles are advantageous as compared to bigger bubbles, due to its perceived creaminess.

Although the bubble sizes seem to be the same for the two gas release agents containing sucrose fatty acid ester, coating is favourable above dispersion in the matrix. That is because the coating leads to the prevention of the formation of a foam layer on top of the bulk liquid, as the following experiment shows.

Similarly as above, dry mixtures were prepared containing 10 gram of dry soup mix 1; 3 gram of gas release agent coated with 5% sucrose fatty acid ester or gas release agent with 5% sucrose fatty acid ester dispersed in the particle matrix (both from Example 5); and 0.2 gram of xanthan gum (Keltrol AP-F). These powders were well mixed to prepare homogeneous dry mixtures. Immediately thereafter 150 mL of hot water (just after boiling) was added to the mixture and manually stirred for 30 seconds. The height of a possible foam layer on top of the liquid was determined at various times. The results are given in the following table.

TABLE 4

Gas retained in millilitre on top of mushroom soup containing coated (5% sucrose fatty acid ester) or 5% sucrose fatty acid ester dispersed in particle matrix.

| time [min] | Dispersed 5% Gas retained [mL] | Coated 5% Gas retained [mL] |
| --- | --- | --- |
| 1 | 55 | 24 |
| 10 | 47 | 20 |
| 20 | 40 | 18 |
| 30 | 32 | 11 |

Figure 4A:
Figure 4B:
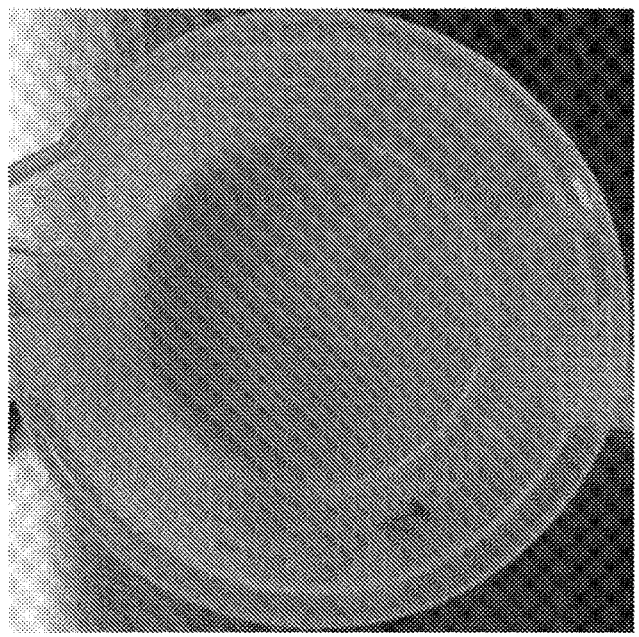

The sample with the coated gas release agent did not have any foam on top of the liquid, all gas was retained in the bulk of the liquid. The sample containing gas release agent with dispersed sucrose fatty acid ester had a foam layer on top of the liquid, of about 2 milliliter (5 minutes after addition of water). The gas bubbles were also relatively large, compared to the sample with coated gas release agent. This is illustrated in FIGS. 4A and 4B showing pictures of the two samples described here, taken from the top, 30 minutes after preparation of the two samples. FIG. 4A shows the presence of relatively large gas bubbles in a foam layer, on top of the mushroom soup containing gas release agent particles with 5% sucrose fatty acid ester dispersed in the particle matrix. FIG. 4B does not show a foamy layer, and no relatively large bubbles, in the mushroom soup containing gas release agent particles coated with 5% sucrose fatty acid ester.

The invention claimed is:

1. A powder composition for preparing a food product comprising gas bubbles dispersed in a continuous phase, which food product is selected from the group consisting of coffee and other coffee-based beverages;

chocolate milk and other cocoa-based beverages;

fruit and/or vegetable-based beverages;

fluid dairy products, other than fluid ice-cream and liquid dairy products labelled as weight management meal replacers;

dry dairy products, other than dry powder dairy products labelled as weight management meal replacers;

infant nutrition products;

bakery and confectionary products;

toppings and desserts, other than ice-cream;

animal feeds;

pet food products;

clinical nutrition food products;

the powder composition comprising:

(a) 5-95 wt. % a gas release agent in particulate form;

(b) 0.5-5 wt. % a thixotropic hydrocolloid in particulate form; and (c) an instant food component in particulate form for the food product, wherein the thixotropic hydrocolloid provides an apparent yield stress of at least 0.5 Pa within a period of 60 seconds after reconstitution of the hydrocolloid with water;

wherein the thixotropic xanthan gum is obtained from the fermentation of *Xanthomonas campestris* pathover *campestris*, deposited with the American Type Culture Collection (ATCC) under the accession no. PTA-11272.

2. The powder composition according to claim 1, wherein the gas release agent comprises particles containing a pressurised gas or a non-pressurised gas.

3. The powder composition according to claim 1, wherein the gas release agent is a chemical gas release agent.

4. The powder composition according to claim 1, wherein the thixotropic hydrocolloid has a hydration rate in water at a temperature of 23° C. at a concentration of 1 wt % of less than 3 minutes.

5. The powder composition according to claim 1, wherein the gas release agent comprises at least one component selected from the group of carbohydrates, proteins, fats and emulsifiers.

6. The powder composition according to claim 1, wherein the thixotropic hydrocolloid has a hydration rate, in water at a temperature of 23° C. at a concentration of 1 wt % and a volume weighted mean diameter D4,3 of the hydrocolloid ranging from 40 to 200 micrometer, of less than 3 minutes.

7. A method for preparing a food product comprising gas bubbles dispersed in a continuous phase, selected from the group of coffee and other coffee-based beverages;

chocolate milk and other cocoa-based beverages;

fruit and/or vegetable-based beverages;

fluid dairy products other than fluid ice-cream and liquid products labelled as weight management meal replacers;

infant nutrition products;

bakery and confectionary products;

toppings and desserts, other than ice cream;

animal feeds;

pet food products;

clinical nutrition food products;

the method comprising reconstituting a composition according to claim 1 in an aqueous liquid of the food product.

8. The method according to claim 7, wherein the aqueous liquid has a temperature in the range of 4-25° C.

9. The method according to claim 7, wherein the aqueous liquid has a temperature within the range of 60-100° C.

10. A food product containing gas bubbles dispersed in a continuous phase, obtainable by the method according to claim 7.

11. The food product according to claim 10, which maintains the gas bubbles in the product for at least 10 minutes after its preparation.

12. The powder according to claim 1, wherein the thixotropic hydrocolloid in particulate form comprises a thixotropic xanthan gum.

13. The powder according to claim 1, wherein upon reconstitution of the powder composition in an aqueous fluid, the thixotropic hydrocolloid is reconstituted, thereby thickening the fluid to form the continuous phase, forming gas bubbles from the gas release agent, and entrapping the gas bubbles in the continuous phase.

14. The food product according to claim 10, selected from the group consisting of coffee and coffee-based beverages; chocolate milk and cocoa-based beverages; fruit and/or vegetable-based beverages; fluid dairy products other than fluid ice-cream and liquid products labelled as weight management meal replacers; infant nutrition products; bakery and confectionary products; toppings and desserts, other than ice cream; animal feeds; pet food products; clinical nutrition food products.

* * * * *